(12) United States Patent
Potter et al.

(10) Patent No.: US 6,389,359 B1
(45) Date of Patent: May 14, 2002

(54) METHODS FOR AUTOMATICALLY DETECTING GPS HARDWARE

(75) Inventors: Scott T. Potter, Norwalk; James R. Ziron, Armston, both of CT (US)

(73) Assignee: Links Point, Inc., New York, NY (US)

( * ) Notice: Subject to any disclaimer, the term of this patent is extended or adjusted under 35 U.S.C. 154(b) by 0 days.

(21) Appl. No.: 09/632,410

(22) Filed: Aug. 4, 2000

Related U.S. Application Data

(60) Provisional application No. 60/218,360, filed on Jul. 12, 2000.

(51) Int. Cl.[7] ............................................... G01C 21/26
(52) U.S. Cl. .................. 701/213; 701/215; 342/357.06; 342/357.1; 342/357.12; 342/361; 455/3.02; 375/316
(58) Field of Search ................................. 701/213, 214, 701/215; 342/357.01, 357.02, 357.06, 357.12, 357.09, 357.1; 375/222, 259, 295, 316, 340, 346; 348/467, 461, 473

(56) References Cited

U.S. PATENT DOCUMENTS

| | | | | |
|---|---|---|---|---|
| 4,852,127 A | * | 7/1989 | Fraser et al. ................ | 375/222 |
| 4,916,539 A | * | 4/1990 | Galumbeck ................ | 348/467 |
| 5,364,093 A | | 11/1994 | Huston et al. ............ | 273/32 R |
| 5,574,722 A | * | 11/1996 | Slykhouse et al. ............ | 370/56 |
| 6,192,070 B1 | * | 2/2001 | Poon et al. .................. | 375/222 |
| 6,205,185 B1 | * | 3/2001 | Kajiwara .................... | 375/316 |
| 6,263,033 B1 | * | 7/2001 | Hansen ........................ | 375/370 |

FOREIGN PATENT DOCUMENTS

| WO | WO 96/21161 | 7/1996 | ............. G01S/5/02 |
|---|---|---|---|

* cited by examiner

*Primary Examiner*—Jacques H. Louis-Jacques
(74) *Attorney, Agent, or Firm*—Fish & Neave; Laura A. Sheridan

(57) ABSTRACT

Methods for automatically detecting GPS hardware are provided. The methods attempt to determine the protocol of a GPS receiver by adjusting variables related to the protocol of the GPS receiver. The variables may include baud rate, protocol, or any other desired variable. Following determination of the proper configuration settings, the methods determine the communications port to configure with the appropriate settings.

3 Claims, 3 Drawing Sheets

METHODS FOR AUTOMATICALLY DETECTING GPS HARDWARE

CROSS REFERENCE TO RELATED APPLICATION

This application claims the benefit of U.S. Provisional Application No. 60/218,360, filed Jul. 12, 2000, entitled AUTOMATIC DETECTION OF GPS HARDWARE, which is hereby incorporated by reference herein in its entirety.

BACKGROUND OF THE INVENTION

The present invention is methods for automatically detecting Global Positioning System (GPS) hardware. More particularly, the present invention is methods which are utilized to detect GPS hardware and configure a user's computer with little or no interaction relating to selection of communications ports, settings and protocols by the user.

GPS receivers are now widely being used with standard computer platforms. Examples of computer platforms which communicate with GPS receivers are handheld computers (such as Personal Digital Assistants), computers in mobile phones, lap-top computers, and automobile computers. When using a GPS receiver in conjunction with a specific computing platform, the consumer may not understand how to configure the platform's communications port that connects to the GPS receiver. In such a case, software on the platform that interacts with the GPS receiver typically will not function until the communications port is properly configured. One example of software that runs on a computer and communicates with a GPS receiver is mapping software, such as that utilized for marine navigation. This mapping software is usually executed in a laptop computer and receives position data from the GPS receiver via a communication link.

In order to use software which runs on a computer and communicates with a GPS receiver, a user must typically enter configuration settings for the communications port. These configuration settings are usually unique for the specific GPS receiver. Thus, the user is required to know the configuration settings which are compatible with the GPS hardware. These settings may include baud rate, communications port, and protocol.

Attempts have been made to standardize the communications protocol used by GPS hardware, but these attempts lack configuration information that is essential to the consumer. Without standardized communications protocol, the consumer must obtain the configuration information—such as baud rate, protocol, and communications port—from both the GPS manufacturer's and the computer manufacturer's documentation, and enter this information into the software application running on the computer. This manual configuration process is both annoying to the user and prone to error due to the variables required.

Thus, it would be desirable to provide methods which automatically detect GPS hardware and configure a communications port on a computer for communication with the GPS hardware without requiring any user interaction.

SUMMARY OF THE INVENTION

In accordance with the principles of the present invention, methods which automatically detect GPS hardware without any user interaction are provided. Using these methods, a user can connect a GPS receiver to a computer platform and allow that platform to detect the GPS receiver and configure the communications port for communication with the connected GPS receiver.

Following connection of a computer to a GPS receiver, the methods attempt to determine the protocol of the GPS receiver by adjusting variables related to the protocol of the GPS receiver. The methods may vary the baud rate, protocol, or any other desired variable in order to determine the proper configuration settings for the communications port. The methods may also vary the communications port in order to determine the port which is connected to the GPS receiver and to apply the proper settings with which to configure the communications port for communication with the GPS receiver.

BRIEF DESCRIPTION OF THE DRAWINGS

Further features of the invention, its nature and various advantages will be more apparent from the following detailed description of the preferred embodiments, taken in conjunction with the accompanying drawings, in which like reference characters refer to like parts throughout, and in which.

DETAILED DESCRIPTION OF THE PREFERRED EMBODIMENTS

Figure 1:
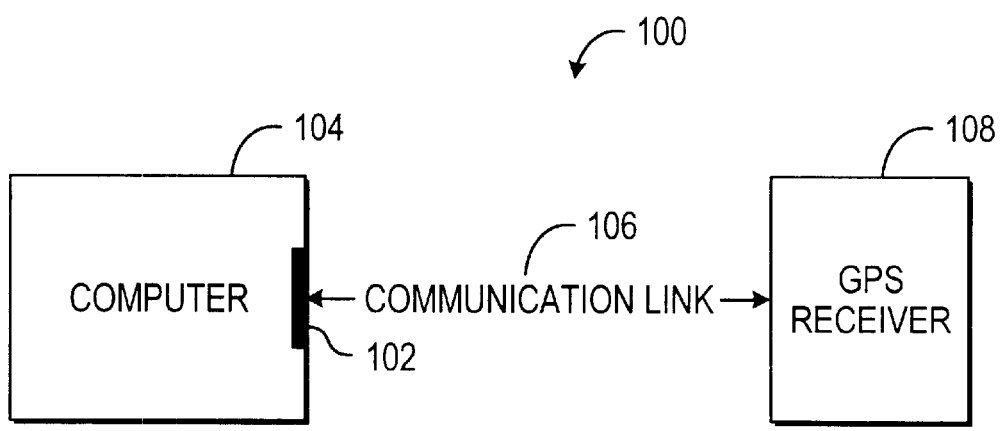
FIG. 1 illustrates a block diagram of a hardware system in accordance with one embodiment of the present invention.
Figure 2:
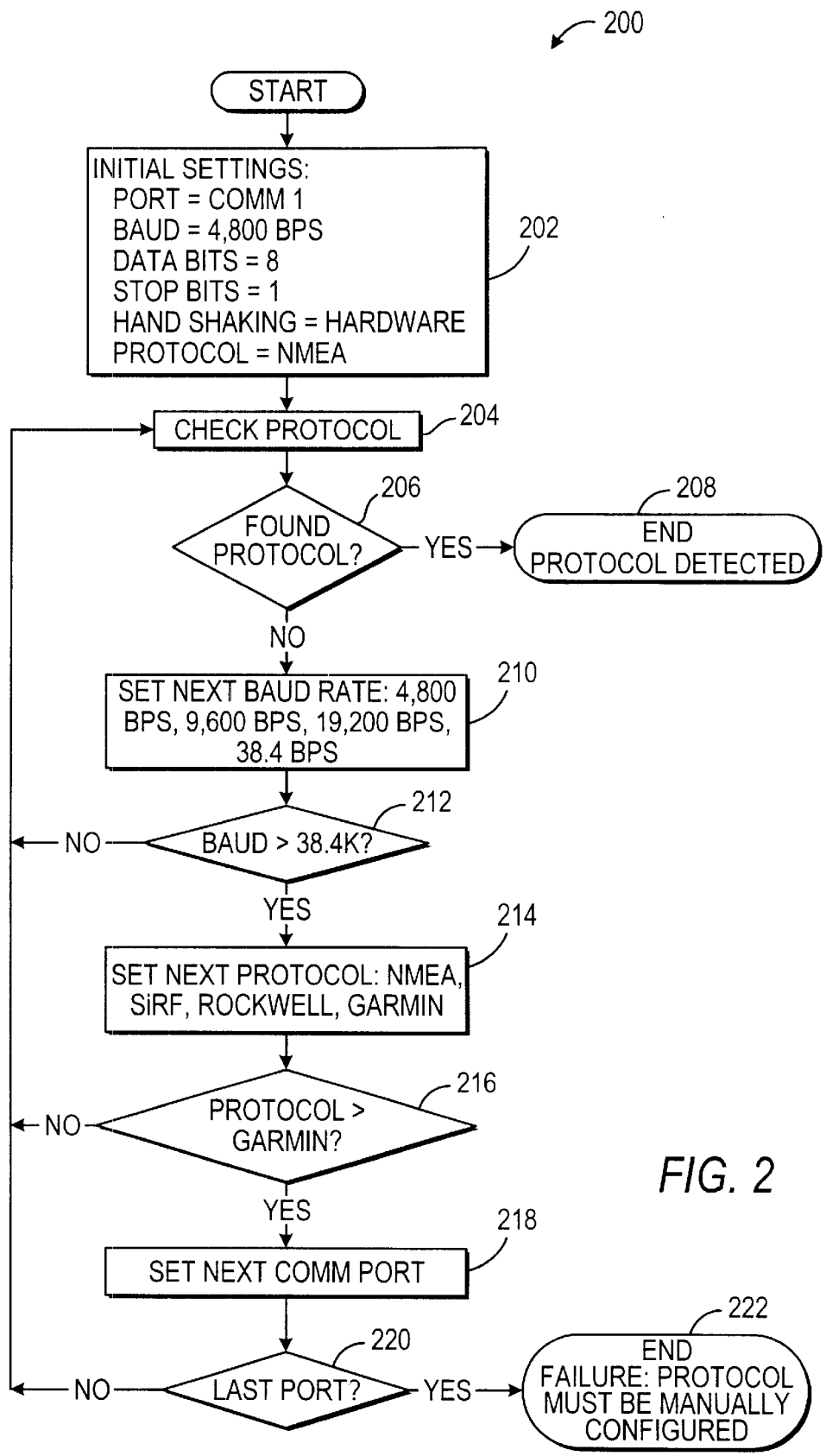
FIG. 2 illustrates a flow diagram of a process for detecting GPS hardware and configuring a communications port in accordance with one embodiment of the present invention.
Figure 3:
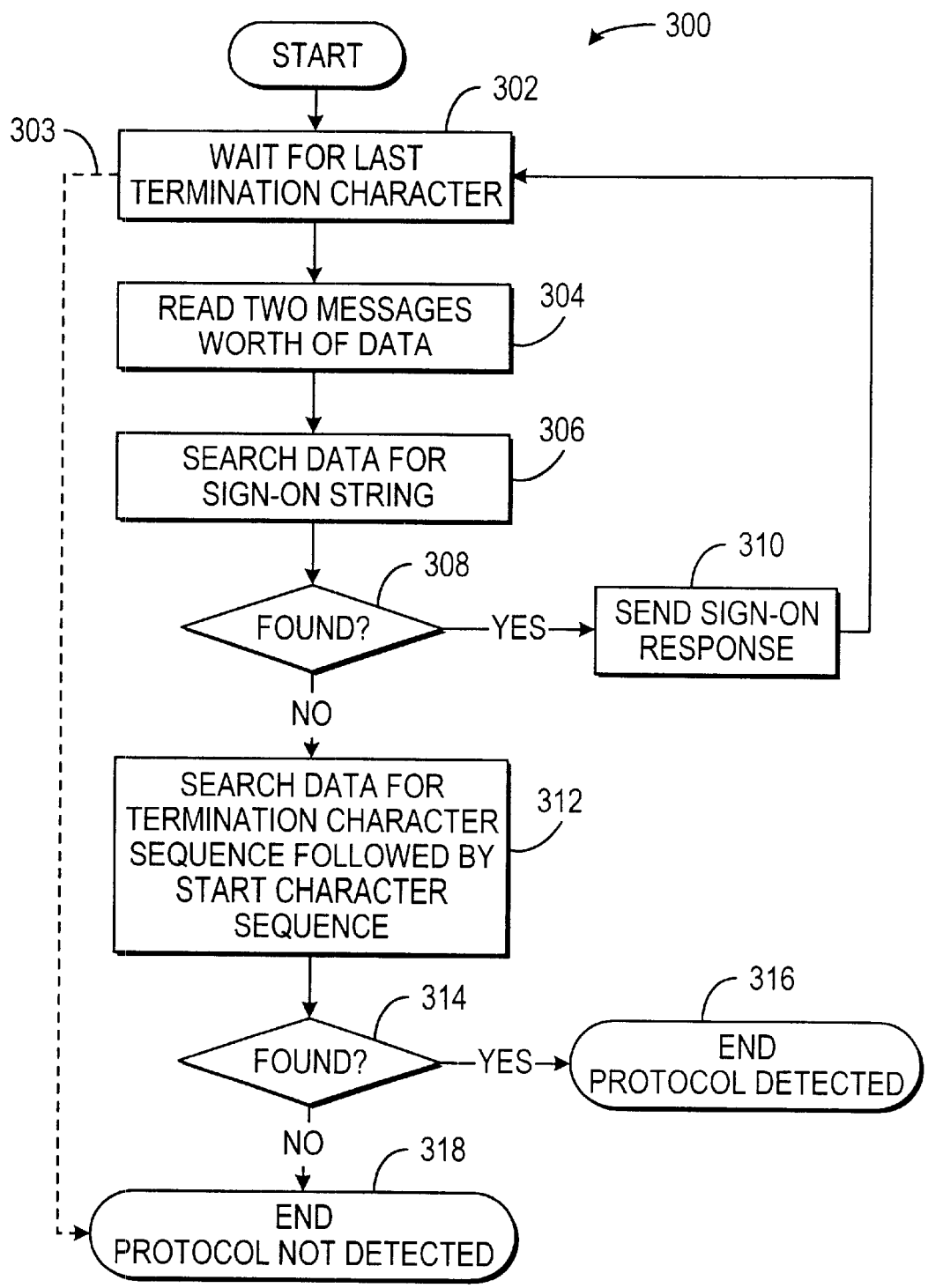
FIG. 3 illustrates a flow diagram of a process for checking the protocol used by GPS hardware in accordance with one embodiment of the present invention.

The present invention is now described in more detail in conjunction with FIGS. 1–3.

Turning to FIG. 1, a block diagram of a system 100 in accordance with one embodiment of the present invention is illustrated. As shown, a communication link 106 connects a communications port 102 of a computer 104 to a GPS receiver 108. Possible communication links 106 are serial lines, optical fibers, parallel connections, and Universal Serial Buses (USBs). Possible types of communications port 102 are serial ports, parallel ports, or USB ports. These communication links and communications ports are merely illustrative, as the present invention may also be implemented using any other suitable connections and ports. Examples of manufacturers of GPS receiver 108 include DeLorme, Lowrance Electronics, Inc., Garmin Corporation, Magellan GPS Systems, and Northstar Technologies. These manufacturers, and others, produce various types of GPS receivers, such as fixed mount, handheld, automotive, aviation, and marine. These manufacturers and types are merely illustrative, as the present invention may be used to recognize GPS receivers of any type and manufacturer. Although system 100 is illustrated with a non-specific computing device 104 in connection with GPS receiver 108, this is merely one possible scenario. System 100 may also utilize the present invention such that GPS receiver 108 is connected via communication link 106 to a handheld computer, mobile phone, lap-top computer, automobile computer, or any other mechanism suitable for communication with a GPS receiver.

Following connection of the computer 104 and GPS receiver 108, the present invention automatically detects the GPS hardware contained in GPS receiver 108 and configures the communications port 102 for functionality between the computer 104 and GPS receiver 108, requiring little or no user interaction.

Turning to FIG. 2, a process 200 for automatically detecting GPS hardware and configuring a communications port is illustrated. As shown, the present invention is initialized with settings at step 202. As indicated, the settings may include setting the port to Comm 1, the baud rate to 4,800 bps, the parity to none, the data bits to 8, the stop bits to 1, the hand shaking to hardware, and the protocol to NMEA. These settings are merely illustrative, and the present invention may be initialized with other suitable settings.

Once the settings have been initialized, process 200 at step 204, checks the protocol of the GPS receiver.

Turning to FIG. 3, a process 300 for performing step 204 in accordance with one embodiment of the present invention is illustrated. In order to check the protocol of the GPS receiver, step 302 of process 300 waits for a termination character to be received. In the event that a termination character is never received, process 300 executes timeout path 303 to step 318, and process 300 is unable to determine a protocol. If step 302 of process 300 receives a termination character, step 304 reads two messages worth of data. These two messages of data are the first two messages in the protocol code. Next, step 306 of process 300 searches the two messages of data for a sign-on string. For example, DeLorme's Tripmate® and Earthmate® GPS receivers use "ASTRAL<CR><LF>" and "EARTHA<CR><LF>", respectively, as sign-on strings. In both sign-on strings, "<CR>" and "<LF>" represent carriage return and line feed characters, respectively. These examples of sign-on strings are merely illustrative, as the present invention may recognize any other suitable sign-on strings, as necessary.

After searching for a sign-on string in step 306 of process 300, test 308 of process 300 checks to see if a sign-on string was found. If a sign-on string was found, step 310 of process 300 sends a sign-on response. Possible sign-on responses, such as those for DeLorme's Tripmate® and Earthmate® GPS receivers, are "ASTRAL<CR><LF>" and "EARTHA<CR><LF>", respectively. These examples are merely illustrative, as the present invention may respond with other suitable sign-on responses, as necessary. If test 308 determines that process 300 did not find a sign-on string, step 312 of process 300 searches the two messages of data for a termination character sequence followed by a start character sequence. Possible termination character sequences and their corresponding protocols are "<CR><LF>" for NMEA and 0xb0, 0xb3 for SiRF. Possible start character sequences and their corresponding protocols are "$" for NMEA and 0xa0, 0xa2 for SIRF. These examples are merely illustrative, as the present invention may search for other suitable start character sequences and termination character sequences.

Next, in test 314, process 300 determines if step 312 found known start and termination character sequences. If test 314 of process 300 determines that the character sequences were identified, process 300 terminates at step 316 and returns step 204 of process 200 (FIG. 2), indicating that a protocol was detected. If test 314 of process 300 determines that the start and termination character sequences were not identified, however, process 300 terminates at step 318 and returns to step 204 of process 200 (FIG. 2) indicating that a protocol was not detected.

Although process 300 is illustrated as performing step 204, process 300 is merely one process available to check the protocol in step 204, and the present invention may utilize another suitable approach.

After performing step 204, process 200 will input the status of step 204 and determine at test 206 if the check was successful. If the protocol was detected, process 200 terminates and indicates that the protocol was detected at step 208. If the protocol was not detected, step 210 sets the next baud rate. As shown, when the baud rate is 4,800 bits per second (bps), the next baud rate will be set to 9,600 bps. If the baud rate is 9,600 bps, the next baud rate will be 19,200 bps. If the baud rate is 19,200 bps, the next baud rate will be 38.4 kbps. If the baud rate is 38.4 kbps, the next baud rate will be reset to the lowest value, 4,800 bps. However, these settings are merely illustrative, as the baud rate may be reset to any other suitable value.

After step 210, test 212 of process 200 compares the current baud rate to a maximum baud rate, such as 38.4 kbps. If the baud rate is not greater than the maximum baud rate (meaning that the baud rate did not just roll from 38.4 kbps to 4,800 bps), process 200 returns to step 204 and checks the protocol of the GPS receiver. If test 212 finds that the baud rate is greater than the maximum baud rate (meaning that the baud rate did just roll from 38.4 kbps to 4,800 bps), process 200 proceeds to step 214 where the protocol is set to the next type. As shown, if the protocol type is initially NMEA, the next protocol to be checked will be SiRF. If the protocol is SiRF, the next protocol will be Rockwell. If the protocol is Rockwell, the next protocol will be Garmin. Finally, if the protocol is Garmin, the next protocol will be NMEA again. However, these settings are merely illustrative, as any suitable protocol types may be used.

After step 214, test 216 checks to see if all protocols have been tested. As shown, the protocols tested are NMEA, SiRF, Rockwell, and Garmin, in that order. If test 216 determines that all possible protocols have not been tested, process 200 returns to step 204 to check the protocol again. If test 216 determines that all possible protocols have been tested, however, step 218 will then set the next communications port. By setting the next communications port, process 200 checks each communications port until determining the communications port 102 on computer 104 that is connected to communication link 106.

Following step 218, test 220 determines if the communications port which is currently set is the last available communications port. If there are remaining communications ports to check, process 200 returns to step 204 and checks the protocol again. If there are no remaining communications ports, process 200 terminates and indicates that the GPS must be manually configured.

Although not shown in process 200 of FIG. 2, the present invention may also try each parity setting, each data bits setting, each stop bits setting, and each hand shaking setting in a similar fashion to the manner in which each baud rate, protocol type, and port number are tried.

It will be understood that the foregoing is only illustrative of the principles of the invention and that various modifications can be made by those skilled in the art without departing from the scope and spirit of the invention, which is limited only by the claims that follow.

What is claimed is:

1. A method for automatically detecting a GPS receiver and configuring a communications port on a computer that is connected to the GPS receiver via a communication link, comprising:

initially setting the communications port to default settings;

determining whether a protocol associated with the GPS receiver is detected;

if the protocol is not detected, sequentially resetting the communication port with different settings and redetermining whether a protocol associated with the GPS receiver is detected; and wherein determining whether the protocol associated with the GPS receiver is detected comprises:
  waiting for a termination character to be received;
  once a termination character is received, receiving a message;
  searching the message for a sign-on string;
  if the sign-on string is not found, searching the message for a termination character followed by a start character; and
  if the termination character followed by the start character is found, indicating that the protocol was detected.

2. The method of claim 1, further comprising sending a sign-on response if the sign-on string is found.

3. The method of claim 1, further comprising indicating that the protocol was not dectected if the termination character followed by the start character is not found.

* * * * *

UNITED STATES PATENT AND TRADEMARK OFFICE
CERTIFICATE OF CORRECTION

PATENT NO.    : 6,389,359 B1
DATED         : May 14, 2002
INVENTOR(S)   : Scott T. Potter et al.

It is certified that error appears in the above-identified patent and that said Letters Patent is hereby corrected as shown below:

Column 3,
Line 47, change "SIRF" to -- SiRF --.

Column 4,
Line 66, change "communication" to -- communications --.

Signed and Sealed this

Fourteenth Day of January, 2003

JAMES E. ROGAN
*Director of the United States Patent and Trademark Office*